United States Patent
Dessouki et al.

(10) Patent No.: US 9,163,682 B2
(45) Date of Patent: Oct. 20, 2015

(54) FRICTION DAMPED BRAKE DRUM

(75) Inventors: Omar S. Dessouki, Beverly Hills, CA (US); Brent D. Lowe, Milford, MI (US); Mark T. Riefe, Brighton, MI (US); Patrick J. Monsere, Highland, MI (US); Mohan Sundar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1601 days.

(21) Appl. No.: 12/178,872

(22) Filed: Jul. 24, 2008

(65) Prior Publication Data

US 2010/0018819 A1    Jan. 28, 2010

(51) Int. Cl.
*F16D 65/10* (2006.01)
*F16D 65/00* (2006.01)

(52) U.S. Cl.
CPC ............ *F16D 65/10* (2013.01); *F16D 65/0006* (2013.01); *F16D 2250/0015* (2013.01)

(58) Field of Classification Search
USPC .............................................. 188/218 R, 381
See application file for complete search history.

(56) References Cited

U.S. PATENT DOCUMENTS

| | | | |
|---|---|---|---|
| 974,024 A | 10/1910 | Carter | |
| 1,484,421 A | 2/1924 | Thomspon | |
| 1,989,211 A | 1/1935 | Norton | |
| 2,012,838 A * | 8/1935 | Tilden | 188/218 A |
| 2,026,878 A * | 1/1936 | Farr | 188/218 R |
| 2,288,438 A * | 6/1942 | Dach | 188/218 R |
| 2,603,316 A | 7/1952 | Pierce | |
| 2,978,793 A | 4/1961 | Lamson et al. | |
| 3,085,391 A | 4/1963 | Hatfield et al. | |
| 3,127,959 A * | 4/1964 | Wengrowski | 188/218 R |
| 3,147,828 A | 9/1964 | Hunsaker | |
| 3,292,746 A | 12/1966 | Robinette | |
| 3,378,115 A | 4/1968 | Stephens, III | |
| 3,425,523 A | 2/1969 | Robinette | |
| 3,509,973 A | 5/1970 | Kimata | |
| 3,575,270 A | 4/1971 | Wagenfuhrer et al. | |
| 3,653,959 A * | 4/1972 | Kehr et al. | 361/600 |
| 3,774,472 A | 11/1973 | Mitchell | |
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,195,713 A | 4/1980 | Hagbjer et al. | |
| 4,250,950 A | 2/1981 | Buxmann et al. | |
| 4,278,153 A | 7/1981 | Venkatu | |
| 4,338,758 A | 7/1982 | Hagbjer | |
| 4,379,501 A | 4/1983 | Hagiwara et al. | |

(Continued)

FOREIGN PATENT DOCUMENTS

| | | |
|---|---|---|
| CH | 428319 A | 1/1967 |
| CN | 2005/10113784 | 10/2005 |

(Continued)

OTHER PUBLICATIONS

International Search Report dated Apr. 2, 2007 for International Application No. PCT US06/29687, Publication No. WO 2007/040768; GM Global Technology Operations, Inc.

(Continued)

*Primary Examiner* — Thomas J Williams
(74) *Attorney, Agent, or Firm* — BrooksGroup

(57) ABSTRACT

A friction damped brake drum for reducing vibrations in a brake drum.

39 Claims, 4 Drawing Sheets

(56) References Cited

U.S. PATENT DOCUMENTS

| | | |
|---|---|---|
| 4,475,634 A | 10/1984 | Flaim et al. |
| 4,523,666 A | 6/1985 | Murray |
| 4,529,079 A | 7/1985 | Albertson |
| 4,905,299 A | 2/1990 | Ferraiuolo et al. |
| 5,004,078 A | 4/1991 | Oono et al. |
| 5,025,547 A | 6/1991 | Sheu et al. |
| 5,083,643 A | 1/1992 | Hummel et al. |
| 5,115,891 A | 5/1992 | Raitzer et al. |
| 5,139,117 A | 8/1992 | Melinat |
| 5,143,184 A | 9/1992 | Snyder et al. |
| 5,183,632 A | 2/1993 | Kluchi et al. |
| 5,184,663 A | 2/1993 | Oono |
| 5,259,486 A | 11/1993 | Deane |
| 5,310,025 A | 5/1994 | Anderson |
| 5,416,962 A | 5/1995 | Passarella |
| 5,417,313 A | 5/1995 | Matsuzaki et al. |
| 5,509,510 A | 4/1996 | Ihm |
| 5,530,213 A | 6/1996 | Hartsock et al. |
| 5,582,231 A | 12/1996 | Siak et al. |
| 5,620,042 A | 4/1997 | Ihm |
| 5,660,251 A | 8/1997 | Nishizawa et al. |
| 5,789,066 A | 8/1998 | DeMare et al. |
| 5,819,882 A | 10/1998 | Reynolds et al. |
| 5,855,257 A | 1/1999 | Wickert et al. |
| 5,862,892 A | 1/1999 | Conley |
| 5,878,843 A | 3/1999 | Saum |
| 5,927,447 A | 7/1999 | Dickerson |
| 5,965,249 A | 10/1999 | Sutton et al. |
| 6,047,794 A | 4/2000 | Nishizawa |
| 6,073,735 A | 6/2000 | Botsch et al. |
| 6,112,865 A * | 9/2000 | Wickert et al. ......... 188/218 XL |
| 6,206,150 B1 | 3/2001 | Hill |
| 6,216,827 B1 | 4/2001 | Ichiba et al. |
| 6,223,866 B1 | 5/2001 | Giacomazza |
| 6,231,456 B1 | 5/2001 | Rennie et al. |
| 6,241,055 B1 | 6/2001 | Daudi |
| 6,241,056 B1 | 6/2001 | Cullen et al. |
| 6,283,258 B1 | 9/2001 | Chen et al. |
| 6,302,246 B1 | 10/2001 | Naumann et al. |
| 6,357,557 B1 | 3/2002 | DiPonio |
| 6,405,839 B1 | 6/2002 | Ballinger et al. |
| 6,465,110 B1 | 10/2002 | Boss et al. |
| 6,481,545 B1 | 11/2002 | Yano et al. |
| 6,505,716 B1 | 1/2003 | Daudi et al. |
| 6,507,716 B2 | 1/2003 | Nomura et al. |
| 6,543,518 B1 | 4/2003 | Bend et al. |
| 6,648,055 B1 | 11/2003 | Haug et al. |
| 6,799,664 B1 | 10/2004 | Connolly |
| 6,880,681 B2 | 4/2005 | Koizumi et al. |
| 6,890,218 B2 | 5/2005 | Patwardhan et al. |
| 6,899,158 B2 | 5/2005 | Matuura et al. |
| 6,932,917 B2 | 8/2005 | Golden et al. |
| 6,945,309 B2 | 9/2005 | Frait et al. |
| 7,066,235 B2 | 6/2006 | Huang |
| 7,112,749 B2 | 9/2006 | DiPaola et al. |
| 7,178,795 B2 | 2/2007 | Huprikar et al. |
| 7,293,755 B2 | 11/2007 | Miyahara et al. |
| 7,594,568 B2 | 9/2009 | Hanna et al. |
| 7,604,098 B2 | 10/2009 | Dessouki et al. |
| 7,644,750 B2 | 1/2010 | Schroth et al. |
| 7,775,332 B2 | 8/2010 | Hanna et al. |
| 7,836,938 B2 | 11/2010 | Agarwal et al. |
| 2002/0084156 A1 | 7/2002 | Ballinger et al. |
| 2002/0104721 A1 | 8/2002 | Schaus et al. |
| 2003/0037999 A1 | 2/2003 | Tanaka et al. |
| 2003/0127297 A1 | 7/2003 | Smith et al. |
| 2003/0141154 A1 | 7/2003 | Rancourt et al. |
| 2003/0213658 A1 | 11/2003 | Baba |
| 2004/0031581 A1 | 2/2004 | Herreid et al. |
| 2004/0045692 A1 | 3/2004 | Redemske |
| 2004/0074712 A1 | 4/2004 | Quaglia et al. |
| 2004/0084260 A1 | 5/2004 | Hoyte et al. |
| 2004/0242363 A1 | 12/2004 | Kohno et al. |
| 2005/0011628 A1 | 1/2005 | Frait et al. |
| 2005/0150222 A1 | 7/2005 | Kalish et al. |
| 2005/0183909 A1 | 8/2005 | Rau, III et al. |
| 2005/0193976 A1 | 9/2005 | Suzuki et al. |
| 2006/0076200 A1 | 4/2006 | Dessouki et al. |
| 2006/0243547 A1 | 11/2006 | Keller |
| 2007/0039710 A1 | 2/2007 | Newcomb |
| 2007/0056815 A1 | 3/2007 | Hanna et al. |
| 2007/0062664 A1* | 3/2007 | Schroth et al. ................. 164/72 |
| 2007/0062768 A1 | 3/2007 | Hanna et al. |
| 2007/0142149 A1 | 6/2007 | Kleber |
| 2007/0166425 A1 | 7/2007 | Utsugi |
| 2007/0235270 A1 | 10/2007 | Miskinis et al. |
| 2007/0298275 A1 | 12/2007 | Carter et al. |
| 2008/0099289 A1 | 5/2008 | Hanna et al. |
| 2008/0185249 A1 | 8/2008 | Schroth et al. |
| 2009/0032569 A1 | 2/2009 | Sachdev et al. |
| 2009/0107787 A1 | 4/2009 | Walker et al. |

FOREIGN PATENT DOCUMENTS

| | | |
|---|---|---|
| CN | 20051113784 A | 10/2005 |
| CN | 1757948 A | 4/2006 |
| CN | 2863313 Y | 1/2007 |
| DE | 24 46 938 | 4/1976 |
| DE | 2446938 A1 | 4/1976 |
| DE | 25 37 038 | 3/1977 |
| DE | 2537038 A1 | 3/1977 |
| DE | 19649919 A1 | 6/1998 |
| DE | 199 48 009 | 3/2001 |
| DE | 19948009 C1 | 3/2001 |
| DE | 60000008 T2 | 3/2002 |
| DE | 101 41 698 | 3/2003 |
| DE | 10141698 A1 | 3/2003 |
| DE | 102005048258 | 10/2005 |
| DE | 102005048258 A1 | 4/2006 |
| DE | 60116780 T2 | 11/2006 |
| EP | 0 205 713 | 12/1986 |
| EP | 0205713 A1 | 12/1986 |
| GB | 1230 274 | 4/1971 |
| GB | 1230274 | 4/1971 |
| GB | 2328952 | 3/1999 |
| JP | 57154533 | 9/1982 |
| JP | 57154533 A | 9/1982 |
| JP | 1126434 U1 | 8/1989 |
| JP | 05-104567 | 4/1993 |
| JP | 11342461 A | 12/1999 |
| JP | 2001512763 T | 8/2001 |
| JP | 2003214465 A | 7/2003 |
| JP | 2004011841 A | 1/2004 |
| KR | 20010049837 A | 6/2001 |
| WO | 9823877 A1 | 6/1998 |
| WO | WO 98/23877 | 6/1998 |
| WO | 0136836 A1 | 5/2001 |
| WO | WO 01/36836 | 5/2001 |
| WO | 2007035206 A2 | 3/2007 |

OTHER PUBLICATIONS

Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.

Z. Wu, C. Richter, L. Menon, A Study of Anodization Process During Pore Formation in Nanoporous Alumina Templates, Journal of the Electrochemical Society, vol. 154, 2007.

W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-505.

I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemic.

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

(56) References Cited

OTHER PUBLICATIONS

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Dessouki et al., U.S. Appl. No. 10/961,813, Coulumb friction damped disc brake rotors, filed Oct. 8, 2004.

Hanna et al., U.S. Appl. No. 11/475,756, Bi-metal disc brake rotor and method of manufacturing, filed Jun. 27, 2006.

Schroth et al., U.S. Appl. No. 11/475,759, Method of casting components with inserts for noise reduction, filed Jun. 27, 2006.

Schroth et al., U.S. Appl. No. 12/025,967, Damped products and methods of making and using the same, filed Feb. 5, 2008.

Hanna et al., U.S. Appl. No. 11/440,916, Bi-metal disc brake rotor and method of manufacture, filed May 25, 2006.

Hanna et al., U.S. Appl. No. 11/554,234, Coulomb damped disc brake rotor and method of manufacturing, filed Oct. 30, 2006.

Walker et al., U.S. Appl. No. 11/926,798, Inserts with holes for damped products and methods of making and using the same, filed Oct. 29, 2007.

Hanna et al., U.S. Appl. No. 11/832,401, Damped product with insert and method of making the same, filed Aug. 1, 2007.

Kleber, et al., U.S. Appl. No. 11/848,732, Cast-in-place torsion joint, filed Aug. 31, 2007.

Hanna et al., U.S. Appl. No. 11/780,679, Method of manufacturing a damped part, filed Jul. 20, 2007.

Aase et al., U.S. Appl. No. 11/969,259, Method of forming casting with frictional damping insert, filed Jan. 4, 2008.

Hanna et al., U.S. Appl. No. 12/165,729, Method for securing an insert in the manufacture of a damped part, filed Jul. 1, 2008.

Hanna et al., U.S. Appl. No. 12/165,731, Product with metallic foam and method of manufacturing the same, filed Jul. 1, 2008.

Agarwal et al., U.S. Appl. No. 11/860,049, Insert with tabs and damped products and methods of making the same, filed Sep. 24, 2007.

Hanna et al., U.S. Appl. No. 12/174,163, Damped part, filed Jul. 16, 2008.

Hanna et al., U.S. Appl. No. 12/174,223, Method of casting damped part with insert, filed Jul. 16, 2008.

Hanna et al., U.S. Appl. No. 12/183,180, Casting noise-damped, vented brake rotors with embedded inserts, filed Jul. 31, 2008.

Hanna et al., U.S. Appl. No. 12/183,104, Low mass multi-piece sound damped article, filed Jul. 31, 2008.

Golden et al., U.S. Appl. No. 12/105,411, Insert with filler to dampen vibrating components, filed Apr. 18, 2008.

Hanna et al., U.S. Appl. No. 11/440,893, Rotor assembly and method, filed May 25, 2006.

Carter, U.S. Appl. No. 11/680,179, Damped automotive components with cast in place inserts and method of making same, filed Feb. 28, 2007.

Ulicny et al., U.S. Appl. No. 12/105,438, Filler material to dampen vibrating components, filed Apr. 18, 2008.

Hanna et al., U.S. Appl. No. 12/272,164, Surface configurations for damping inserts, filed Nov. 17, 2008.

Hanna et al., U.S. Appl. No. 12/145,169, Damped product with an insert having a layer including graphite thereon and methods of making and using the same, filed Jun. 24, 2008.

Lowe et al., U.S. Appl. No. 12/174,320, Damped part with insert, filed Jul. 16, 2008.

Xia, U.S. Appl. No. 12/858,596, Lightweight brake rotor and components with composite materials, filed Sep. 20, 2007.

Sachdev et al., U.S. Appl. No. 11/832,356, Friction welding method and products made using the same, filed Aug. 1, 2007.

Chinese First Office Action; CN200510113784.X; Dated May 18, 2007; 19 pages.

Chinese Second Office Action; CN200510113784.X; Dated Feb. 15, 2008; 13 pages.

German Examination Report; DE102005048258.9-12; Dated Oct. 22, 2007; 8 pages.

Gerdemann, Steven J,; Titanium Process Technologies; Advanced Materials & Processes, Jul. 2001, pp. 41-43.

Mahoney, M. W. & Lynch S. P.; Friction-Stir Processing; 15 pages.

MPIF: All You Need to Know about Powder Metallurgy; http://www.mpif.org/IntroPM/intropm/asp?linkid=1; 8 pages.

Powder Metallurgy—Wikipedia article; http://en.wikipedia.org/wiki/Powder_metallurgy; 5 pages.

Sintering—Wikipedia article; http://en.wikipedia.org/wiki/Sintering; 2 pages.

Magnetorheological fluid—Wikipedia article; http:en/wikipedia.org/wiki/Magnetorheological_fluid.

PCT/US2008/087354 Written Opinion and Search Report; Date of Mailing: Aug. 3, 2009; 9 pages.

PCT/US2009/039839 Written Opinion and Search Report; Date of Mailing: Nov. 24, 2009; 7 pages.

PCT/US2009/048424 Written Opinion and Search Report; Date of Mailing; Dec. 28, 2009; 7 pages.

U.S. Appl. No. 12/328,989, filed Dec. 5, 2008; First Named Inventor: Patrick J. Monsere.

U.S. Appl. No. 12/420,259, filed Apr. 8, 2009; First Named Inventor: Michael D. Hanna.

U.S. Appl. No. 12/434,057, filed May 1, 2009; First Named Inventor: Chongmin Kim.

U.S. Appl. No. 12/436,830, filed May 7, 2009; First Named Inventor: James G. Schroth.

U.S. Appl. No. 12/489,901, filed Jun. 23, 2009; First Named Inventor: Michael D. Hanna.

U.S. Appl. No. 12/885,813, filed Sep. 20, 2010; First Named Inventor: Micahel D. Hanna.

http://www.merriam-webster.com/dictionary/engulf, May 29, 2012, 1 page.

\* cited by examiner

FRICTION DAMPED BRAKE DRUM

TECHNICAL FIELD

The field to which this invention generally relates includes friction damped brake components for use in automotive applications.

BACKGROUND

Motor vehicle brake components are commonly subjected to vibrations during the course of normal operation. Among other potential adverse affects, these vibrations may result in noise that gets transmitted into the vehicle's passenger compartment and beyond. For example, the occurrence of both low and high frequency vibrations in one or more brake components oftentimes results in a particular noise that is heard and felt by a driver while braking. Thus, in various applications, reducing brake component vibrations may be helpful in improving, among others, driver comfort and overall performance of the brake component.

SUMMARY OF EXEMPLARY EMBODIMENTS OF THE INVENTION

One embodiment of a product may include a brake drum having a web portion and a wall portion depending from the web portion and defining an inner cylindrical face configured for frictional engagement with at least one brake element. At least one insert may be disposed inside the web portion, the wall portion, or the web portion and the wall portion. The at least one insert friction damps vibrations in the brake drum by forming an interfacial boundary that experiences relative movement and generates friction when vibrations are imparted to the brake drum.

Another embodiment of a product may include a brake drum constructed from a first material and comprising a web portion and a wall portion depending from the web portion and defining an inner cylindrical face configured for engagement with at least one brake element. The wall portion may include a labyrinth section for movably pairing with a backing plate and a hoop section between the labyrinth section and the web portion that comprises most of the inner cylindrical face. At least one insert constructed from a second material may be at least partially disposed in the wall portion and may also include a textured surface. An interfacial boundary may be formed along an interior surface of the wall portion and the textured surface of the at least one insert such that relative movement experienced at the interfacial boundary generates friction and dissipates energy so as to reduce vibrations in the brake drum when the at least one brake element engages the inner cylindrical face.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

Figure 1:
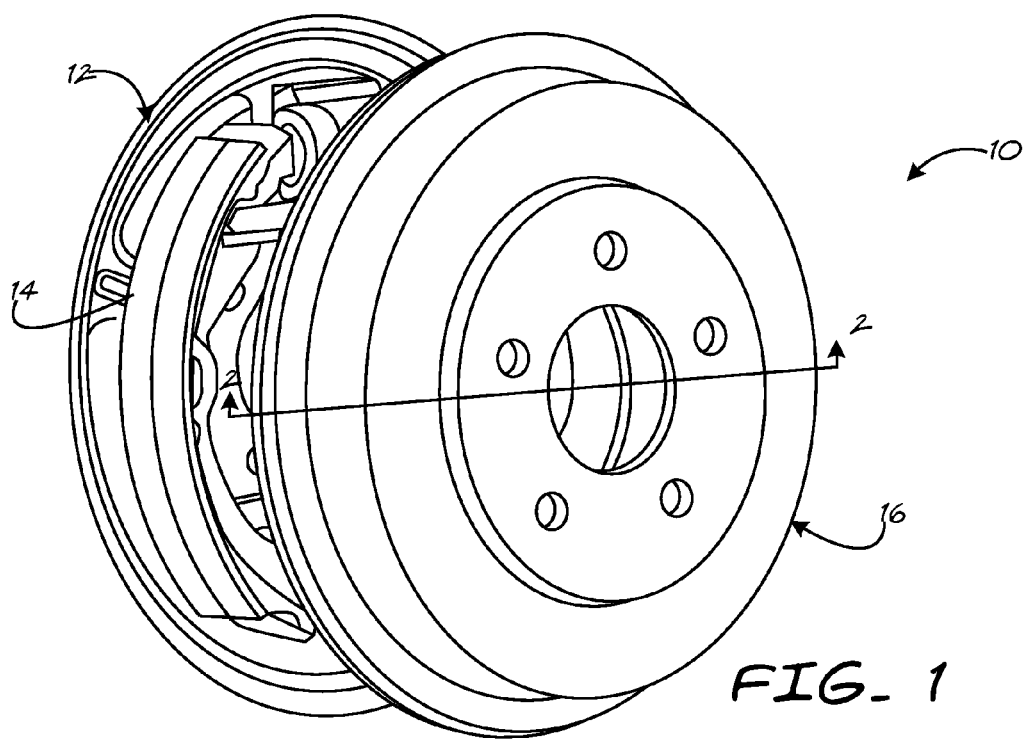
FIG. 1 is a perspective view of a brake drum assembly according to one embodiment of the invention.

The following description of the embodiment(s) is merely exemplary in nature and is in no way intended to limit the invention, its application, or uses.

In general, and before referring to the drawings, various exemplary embodiments of a brake drum are described. To friction damp the brake drum, at least one insert may be disposed in the brake drum. The presence of the insert helps reduce vibrations through and from the brake drum by converting mechanical energy in the form of vibrations into thermal energy by way of friction. Moreover, reducing vibrations in the brake drum also reduces noise associated therewith.

Referring now to FIG. 1, there is generally shown the components of an exemplary embodiment of a brake drum assembly 10 for use in vehicle braking applications. The brake drum assembly 10 includes, among others, a backing plate 12, at least one brake element 14 carried by the backing plate 12, and a brake drum 16. The backing plate 12 may be a generally circular component that is secured in a stationary manner to a non-rotatable automobile component (not shown) such as, for example, a steering knuckle, axle housing, or strut-spindle assembly. The at least one brake element 14 may be a pair of opposed brake elements 14—also known as brake shoes—that are carried by the backing plate 12 and configured for selective outward movement upon actuation from a driver of the vehicle. For instance, depressing a foot pedal or pulling a hand lever may generate hydraulic, pneumatic, or mechanical pressure sufficient to move the brake shoes in such an outward fashion. The brake drum 16 may be a generally circular component sized with a diameter roughly equal to that of the backing plate 12. And as such it may be movably paired at one end with the backing plate 12 to enclose the brake elements 14 therein while at the same time being mounted to a respective vehicle wheel (not shown) at its other end so that it can experience co-rotation with the wheel about the stationary backing plate 12. The brake drum 16 may be constructed from, for example, gray cast iron, a ceramic, a polymer composition, or any other appropriate material known to skilled artisans. In operation a driver can controllably stop or slow rotation of the vehicle wheel and ultimately movement of the vehicle by actuating the brake elements 14 and causing them to frictionally engage the rotating brake drum 16 with a sufficient force. Indeed, skilled artisans will know the further components, and general construction, arrangement, and operation of the brake drum assembly 10, the backing plate 12, and the at least one brake element 14 such that a more complete description need not be given here.

Figure 2:
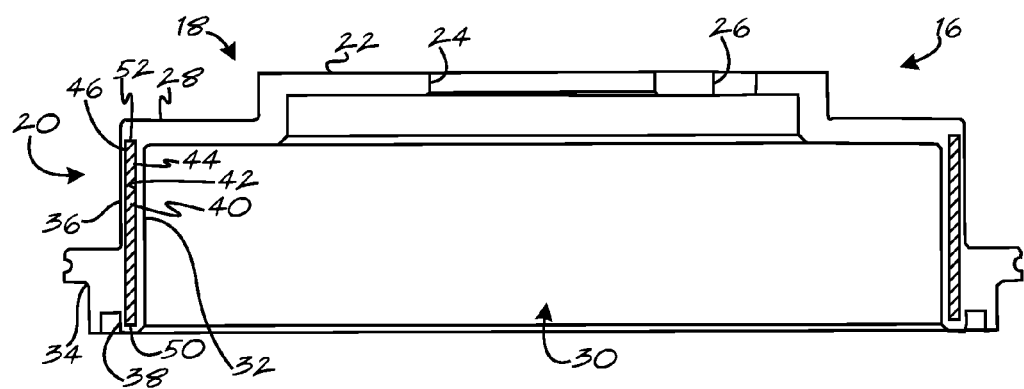
FIG. 2 is a cross-sectional view along the line 2-2 of the brake drum of FIG. 1.

Referring now to FIG. 2, there is shown one embodiment of a friction damped brake drum 16 that can pair with the backing plate 12 and enclose the brake elements 14 therein, and which generally includes a web portion 18 and a wall portion 20. The web portion 18 of the brake drum 16 may be constructed for attachment to the vehicle wheel and is normally spaced apart and parallel to the backing plate 12 when the brake drum 16 is paired therewith. In this particular embodiment, the web portion 18 has a top wall 22 that defines an axle hole 24 for extension of an axle therethrough as well as a plurality of bolt holes 26 that facilitate attachment to the vehicle wheel. The top wall 22, as shown, is elevated slightly above and parallel to a periphery 28 of the web portion, but is not required to do so as the web portion 18 may take on a variety of configurations.

The wall portion 20 depends circumferentially from and is integral with the periphery 28 of the web portion 18 so as to form a one-piece brake drum 16 that can pair with the backing plate 12. The wall portion 20 generally defines a mouth 30 at an end opposite the web portion 18 for accepting the brake elements 14 and other components carried on the backing plate 12, and further provides an inner cylindrical face 32 shaped and conditioned for experiencing selective frictional engagement with the brake elements 14 at the driver's discretion. The axial height of the wall portion 20 is generally determined with regards to the type of vehicle for which the brake drum is designed and can therefore vary across vehicle makes and models. Here, the wall portion 20 may include a labyrinth section 34 and a hoop section 36.

The labyrinth section 34 may span continuously circumferentially along the mouth 30 of the wall portion 20 and is constructed for rotatable pairing with the stationary backing plate 12. While the labyrinth section 34 may be of any known construction and arrangement, it is shown in this embodiment as a radially outwardly protruding band that defines a groove 38 for receiving the backing plate 12 therein. The hoop section 36 may be integrally arranged between the labyrinth 34 section and the web portion 18 and generally embodies a considerable share of the inner cylindrical face 32. As such, in this embodiment, the hoop section 36 constitutes a larger proportion of the wall porton's 20 axial height in order to accommodate engagement with the brake elements 14. Of course, skilled artisans will appreciate that the above description of the brake drum 16, including the web portion 18 and the wall portion 20, is merely an illustrative and exemplary in nature and that many different constructions, variations, and arrangements are possible.

At least one insert 40 may be disposed in the wall portion 20 so as to reduce vibrations through and from the brake drum 16, and thus the noise associated therewith. For example, both high and low frequency vibrations may be imparted to the brake drum 16 when the brake elements 14 frictionally engage the inner cylindrical face 32 of the wall portion 20. High frequency vibrations are generally regarded as those in the range of about 1000 Hz to 18,000 Hz, and are often associated with a noise referred to as brake squeal. On the other hand, low frequency vibrations are generally regarded as those below 1000 Hz, and are often associated with a variety of noises such as brake grown, moan, and howl. The insert 40 may be formed from materials that have or can be modified to have a higher melting point than the material from which the wall portion is composed. Specific examples of such materials include, but not limited to, a low carbon mild steel such as AISI 1010 steel and AISI 1008 steel, aluminum steel composites, cast iron, grey cast iron, ferrous manganese alloys, metal matrix composites, ductile iron, and stainless steel.

Figure 3:
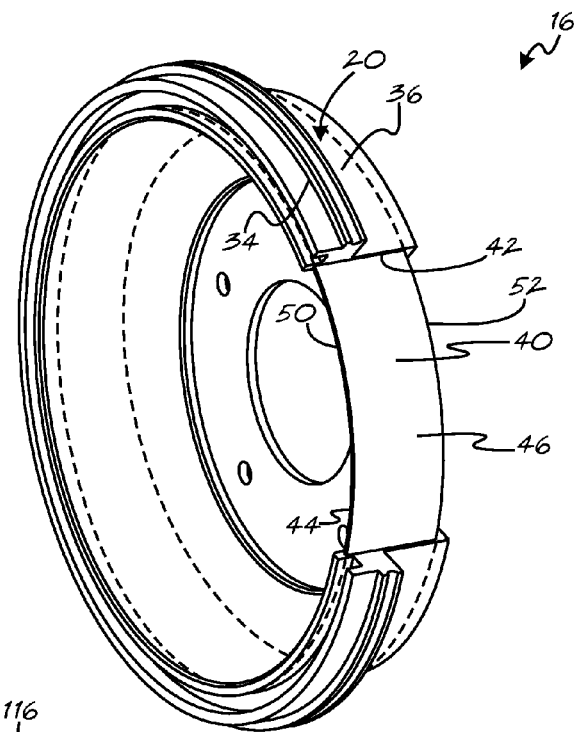
FIG. 3 is a perspective view of a brake drum according to one embodiment of the invention and having a segment of the wall portion cut away.

As best shown in FIG. 2 and FIG. 3, the insert 40 of this embodiment may be continuously circumferentially disposed in both the labyrinth section 34 and the hoop section 36 of the wall portion 20 so as to assume a unitary and uninterrupted circular shape. The insert 40 may be rectangular in cross-section and may be substantially coextensive in axial height with the wall portion 20. Furthermore, in this embodiment, the insert 40 may friction damp the brake drum 16 by forming an interfacial boundary with itself or with an opposed or adjacent interior surface 42 of the wall portion 20 of the brake drum 16. The interior surface 42 may intimately surround the entire insert 40 as shown or it may leave certain sections unbounded and even exposed to the environment outside the brake drum 16 if desired or dictated by the brake drum's 16 manufacturing protocols.

The term "interfacial boundary" denotes a surface boundary between mechanically distinguishable and contacting surfaces which may experience relative motion such that friction is generated therebetween in response to vibrations imparted to the brake drum 16. And friction between two surfaces in contact with each other may provide a source of energy dissipation. In other words, the presence of friction between the interior surface 42 of the wall portion 20 and a contacting surface of the insert 40, between particles present on the insert 40 (described below) and the insert 40, or between the particles themselves, reduces vibrations through and from the brake drum 16 by converting mechanical energy in the form of vibrations into thermal energy.

To facilitate the formation of an interfacial boundary the insert 40 may be provided with a textured surface that resists binding or sticking to itself or the interior 42 surface of the wall portion 20. For instance, the surface of the insert 40 may be defined by a rough or uneven contour as exemplified by a host of peaks and valleys. The average depth of the valleys (or height of the peaks) may range from about 1 µm to about 300 µm, and usually ranges from about 50 µm to about 260 µm or from about 100 µm to about 160 µm. And an insert 40 exhibiting such a rough or uneven contour helps ensure that meaningful frictional contact can occur with the contacting interior surface 42, whether it be smooth or roughened as well. An insert 40 having a rough or uneven surface contour may be prepared by a surface deformation technique such as shot-peening, etching, sand-blasting, water jet blasting, glass bead blasting, or any other known surface modifying process capable or producing a similar effect.

As another example, which may be used in combination with a rough or uneven surface contour if desired, the insert 40 may be provided with a textured surface by imbedding or bonding particles or fibers thereon. Such particles or fibers may promote meaningful frictional contact with each other and/or the interior surface 42 of the wall portion, and further prevent the insert 40 from wetting or melting and therefore becoming integrally incorporated into the brake drum 16 during its manufacture such that an interfacial boundary cannot form. Suitable particles or fibers may be irregularly shaped and formed of refractory materials such as, for example, silica, alumina, graphite with clay, silicon carbide, silicon nitride, cordierite (magnesium-iron-aluminum silicate), mullite (aluminum silicate), zirconia (zirconium oxide), phyllosilicates, or any other known material capable of resisting flow and erosion at high temperatures (usually above 1100° F.) often encountered while manufacturing the brake drum 16, as will be briefly described below. The particles or fibers may be imbedded into the surface of the insert 40 under simple compressive forces or they may be bonded to the surface of the insert 40 by way of a coating applied thereto. Such a coating may constitute any suitable binder such as, for example, epoxy resins, phosphoric acid binding agents, calcium aluminate cements, wood flour, clays, or a lignosulfonate binder such as calcium lignosulfonate. One specific example of an appropriate particle or fiber coating is a water-soluble graphite with 1.5% binder material. This coating can be applied from solution to an oxide and oil free surface of the insert 40 by a spraying or dipping procedure. The applied coating may then be cured at a relatively high temperature of, for example, around 500° C. for about two hours. Another specific example of an appropriate particle or fiber coating is IronKote, which is available from Vesuvius Canada Refractories, Inc., of Welland, Ontario. IronKote is composed of alumina particles (about 47.5%) and silicate particles (about 39.8%) dispersed in a lignosulfonate binder. Still other particle or fiber coatings include Ladle Kote graphite with a 3% to 10% binder, and ceramic coatings such as boron nitride, aluminum oxide and silicates. While the thickness of the applied coating may vary depending on, among others, its compositional makeup and the environment to which it may be exposed, it usually ranges from about 1 µm to 400 µm, from about 10 µm to 400 µm, from about 30 µm to 300 µm, from about 30 µm to 40 µm, from about 40 µm to 100 µm, from about 100 µm to 120 µm, from about 120 µm to 200 µm, from about 200 µm to 300 µm, from about 200 µm to 250 µm, or variations of these ranges.

Referring back to the embodiment shown in FIGS. 2 and 3, two relatively sizeable interfacial boundaries may be formed along the interior surface 42 of the wall portion 20 and the insert 40 at the radial inner edge 44 and the radial outer edge 46 of the insert 40, as best shown in FIG. 2. Additional interfacial boundaries not quite as capacious as those at the radial inner edge 44 and the radial outer edge 46, yet still noteworthy, are also formed between the interior surface 42 of the wall portion 20 and an axial bottom edge 50 and an axial top edge 52 of the insert 40. The presence of multiple interfacial boundaries, as well as the substantially coextensive relationship between the insert 40 and the wall portion 20, helps facilitate the reduction of vibrations through and from the brake drum 16 by providing an appreciable surface area where friction, and thus energy dissipation, can occur. The insert 40 shown here may have a radial thickness defined by radial inner edge 44 and radial outer edge 46 of about 20% to about 50% of the radial thickness of the hoop section 36. It may also have an axial thickness defined by axial bottom edge 50 and axial top edge 52 of about 50% to 90% of the axial height of the wall portion 20. In alternative embodiments, the insert 40 may extend axially through the labyrinth section 34 such that its axial bottom edge 50 is flush with a corresponding end of the labyrinth section 34 and essentially coplanar with the mouth 30, or ribs or nubs may protrude radially from the radial outer edge 46 of the insert 40 and through the hoop section 36. Such alternative embodiments may be the residual effects of specific manufacturing practices intended to facilitate the specific placement and alignment of the insert 40 in the brake drum 16. It should be noted, however, that the size, shape, orientation, location, and quantity of the at least one insert 40 may be varied as exemplified by the many alternative exemplary embodiments described below.

By way of non-limiting example, the friction damped brake drum 16 of this embodiment may be manufactured in accordance with conventional casting techniques known to skilled artisans. For instance, and in general, the insert 40 may be prepared with a textured surface to facilitate the formation of the interfacial boundary and then placed into a mold cavity for subsequent casting of the brake drum 16. The prepared insert 40 may be aligned and placed into, for example, a sand mold having a mold cavity that substantially represents the final shape of the brake drum 16. The insert 40 may be secured and aligned in place by any known mechanism such as locating pins and/or chaplets or it may be lodged into and carried by the sand mold, to name but a few examples. A molten material of a predetermined composition appropriate for the brake drum 16 may then be cast, injected, or otherwise introduced into the mold so that it may engulf all or a substantial part the insert 40 while conforming to the shape and contour of the mold cavity. Once the molten material has sufficiently cooled, the brake drum 16 with the insert 40 disposed in the wall portion 20 thereof may be removed from the mold cavity and further machined or processed if necessary. For example, any voids present in the brake drum 16 after the locating pins and/or chaplets are removed may now be filled with additional molten material, or any portions of the insert 40 that were once lodged in the sand mold and now consequently protrude externally from the brake drum 16 may be removed.

Figure 4:
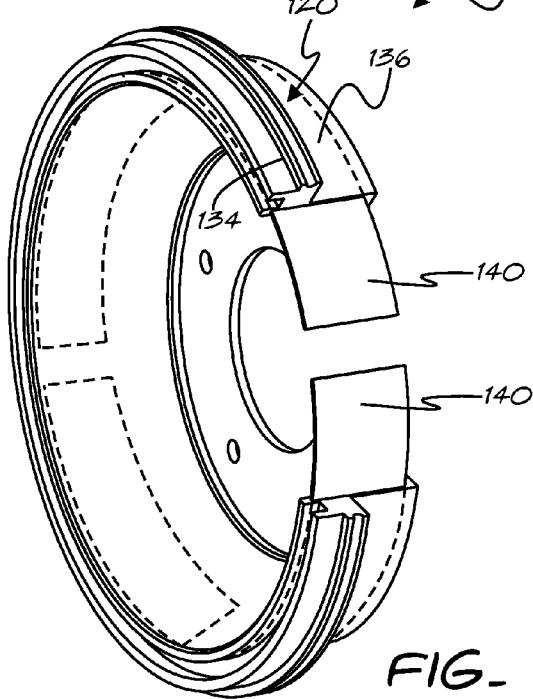
FIG. 4 is a perspective view of a brake drum according to one embodiment of the invention and having a segment of the wall portion cut away.

One alternative exemplary embodiment of a friction damped brake drum 116 is shown in FIG. 4. This embodiment is similar in many respects to the embodiment of FIG. 2 and FIG. 3 and, as such, those similarities will not be repeated here. At least one difference in this embodiment is that a plurality of arcuate inserts 140 are disposed and circumferentially aligned in an end-to-end relationship in both the labyrinth section 134 and the hoop section 136 of the wall portion 120. Each insert 142 is of a similar shape and size and spans approximately along an 85° arc of the wall portion 120. While this embodiment shows four identical inserts 140 disposed in the wall portion 120, skilled artisans will appreciate that the size, shape, and number of inserts 140 may vary from that shown and described. For example, a plurality of arcuate inserts, each spanning from about 15° to about 135°, may be similarly disposed in the brake drum 116.

Figure 5:
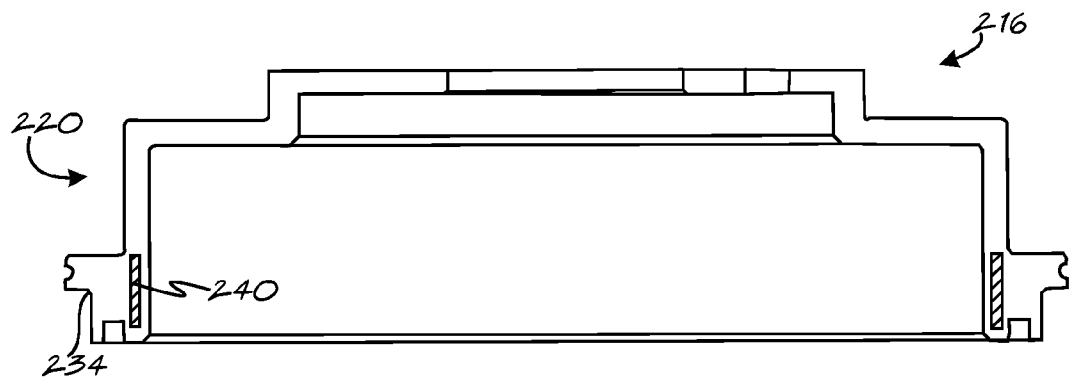
FIG. 5 is a cross-sectional view of a brake drum according to one embodiment of the invention.

Another exemplary embodiment of a friction damped brake drum 216 is shown in FIG. 5. This embodiment is similar in many respects to the embodiment of FIG. 2 and FIG. 3 and, as such, those similarities will not be repeated here. At least one difference in this embodiment is that an insert 240 is circumferentially disposed in only the labyrinth section 234 of the wall portion 220. As shown, the insert 240 may be rectangular in cross-section and substantially coextensive in axial height with the labyrinth section 234.

Figure 6:
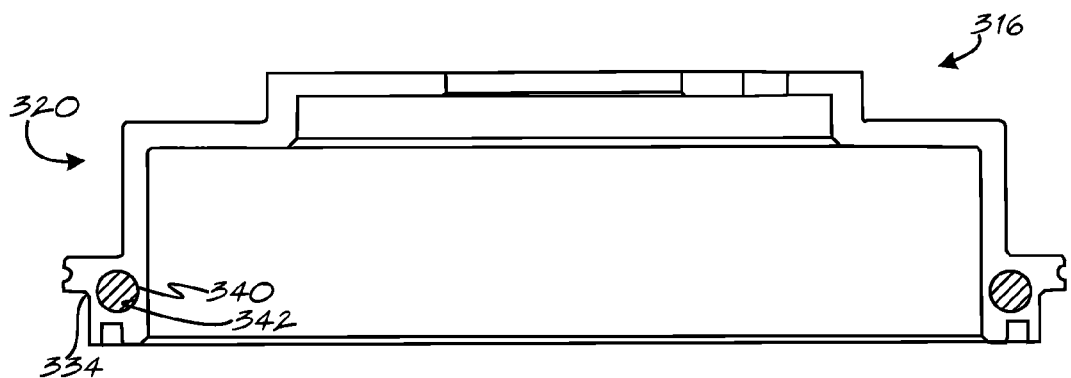
FIG. 6 is a cross-sectional view of a brake drum according to one embodiment of the invention.

Another exemplary embodiment of a friction damped brake drum 316 is shown in FIG. 6. This embodiment is similar in many respects to the embodiment of FIG. 2 and FIG. 3 and, as such, those similarities will not be repeated here. At least one difference in this embodiment is the cross-sectional shape of an insert 340. In one embodiment, the insert 340 may have a generally circular cross-section and is circumferentially disposed in only the labyrinth section 334 of the wall portion 320. Here, an interfacial boundary is formed such that the magnitude of friction experienced between the insert 340 and an interior surface 342 of the wall portion 320 is substantially equivalent in all directions around the insert 340. In like manner the insert 340 may be a shaped as a hollow ring or square or any other desired cross-sectional design.

Figure 7:
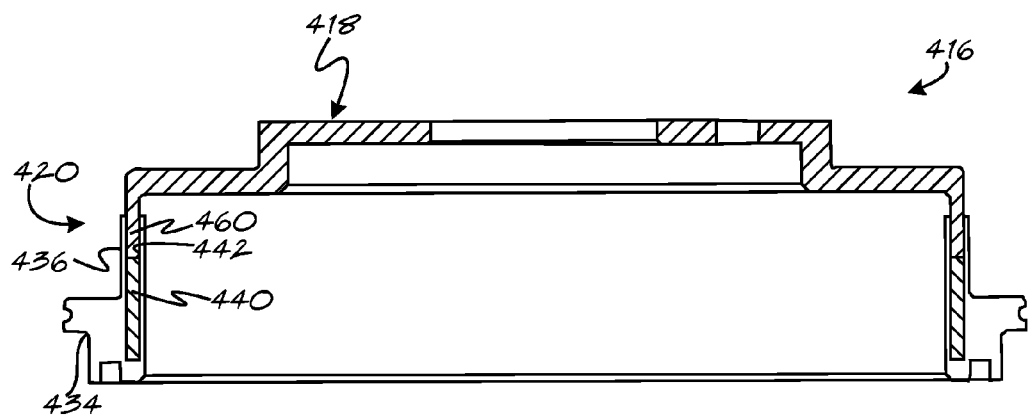
FIG. 7 is a cross-sectional view of a brake drum according to one embodiment of the invention.

Another exemplary embodiment of a friction damped brake drum 416 is shown in FIG. 7. This embodiment is similar in many respects to the embodiment of FIG. 2 and FIG. 3 and, as such, those similarities will not be repeated here. At least one difference in this embodiment is that the web portion 418 and the wall portion 420 form a two-piece brake drum 416 such that the web portion 418, in addition to its normal functions, also includes an axially extending edge 460 that includes a portion which constitutes an insert 440 and forms an interfacial boundary within the wall portion 420.

The axially extending edge 460 may be partially and circumferentially disposed in at least the hoop section 436 of the wall portion 420. In the embodiment shown, the axially extending edge 460 of the web portion 418 extends axially through the hoop section 436 and partially into the labyrinth section 434 of the web portion 420. The insert 440 represents approximately the lower half of the axially extending edge 460; although such a configuration is not necessary and may indeed vary so long as a sufficient portion of the axially extending edge 460 is available for metallurgically binding the web portion 418 to an interior surface 442 of the wall portion 420. This two-piece brake drum 416 may also be manufactured by a conventional casting process. For instance, the web portion 418 may be formed by known techniques with the portion of the axially extending edge 460 that will serve as the insert 440 being prepared with a textured surface in a manner as previously described. Next, the web portion 418 may be aligned and securely placed into a mold cavity of a mold. A molten material may then be introduced into the cavity to form the wall portion 420 circumferentially around the axially extending edge 460 of the web portion 418. Thus, in this embodiment, an interfacial boundary is formed along the insert 440 and its respective part the interior surface 442 while the remainder of the axially extending edge 460 is intimately and fixedly bonded to its respective part of the interior surface 442 to secure the web portion 418 and the wall portion 420 together and provide strength and durability to the brake drum 416.

Figure 8:
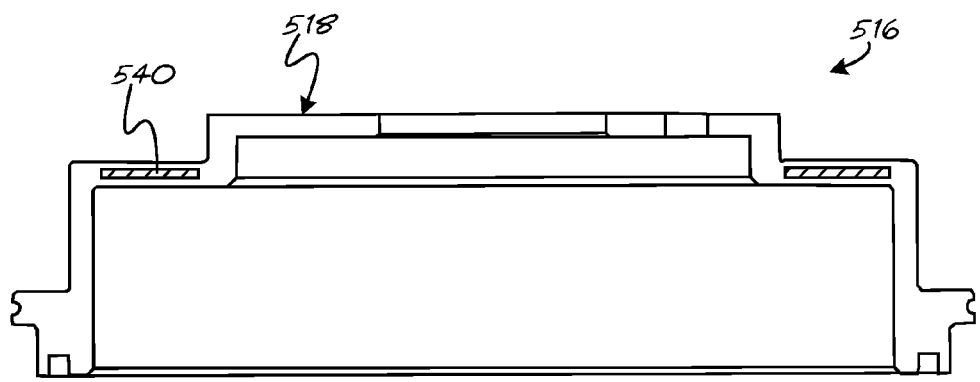
FIG. 8 is a cross-sectional view of a brake drum according to one embodiment of the invention.

Another exemplary embodiment of a friction damped brake drum 516 is shown in FIG. 8. This embodiment is similar in many respects to the embodiment of FIG. 2 and FIG. 3 and, as such, those similarities will not be repeated here. At least one difference in this embodiment is that an insert 540 is circumferentially disposed in only a web portion 518 of the brake drum 516. The insert may be rectangular in cross-section and substantially radially coextensive with a periphery 528 of the web portion 518.

Although not particularly shown or described, subject matter of each of the various exemplary embodiments may be implemented alone or in combination with each other throughout the many parts of a brake drum. For example, the insert 240 of FIG. 5 may be enclosed entirely within and circumferentially along only the hoop section 236, and may or may not be substantially coextensive in axial height therewith. Additionally, multiple one-piece inserts 340 like the one shown in FIG. 6 may be disposed in the hoop section 336, the labyrinth section 334, or both, with uniform or non-uniform axial spacing therebetween. Furthermore, the insert 340 of FIG. 6 may emulate and be disposed within the wall portion 320 much like the plurality of arcuate inserts 140 shown in FIG. 4. And still further, the inserts of the various exemplary embodiments may be disposed in the wall portion such that they are not entirely enclosed therein. For example, the insert 40 shown and described in FIG. 2 and FIG. 3 may extend axially through the labyrinth section 34 such that its axial bottom edge 50 is flush with a corresponding end of the labyrinth section 34 and essentially coplanar with the mouth 30.

The above description of embodiments of the invention is merely exemplary in nature and, thus, variations thereof are not to be regarded as a departure from the spirit and scope of the invention.

What is claimed is:
1. A product comprising:
 a brake drum having a web portion and a wall portion depending from the web portion and defining an inner cylindrical face configured for frictional engagement with at least one brake element; and
 at least one cast-in-place insert intimately surrounded by the web portion, the wall portion, or both the web portion and the wall portion; the web portion and wall portion comprising cast metal, wherein the cast metal engulfs substantially all of the insert,
 wherein the at least one insert friction damps vibrations in the brake drum by forming an interfacial boundary that experiences relative movement with respect to the cast metal and generates friction when vibrations are imparted to the brake drum.

2. The product of claim 1 wherein the wall portion comprises a labyrinth section for pairing with a backing plate and a hoop section between the labyrinth section and the web portion that comprises most of the inner cylindrical face.

3. The product of claim 2 wherein the at least one insert is circumferentially disposed in both the labyrinth section and the hoop section.

4. The product of claim 3 wherein the hoop section defines a radial thickness of the wall portion and the labyrinth section and the hoop section defines an axial thickness of the wall portion, and wherein the at least one insert is rectangularly sized in cross section to have a radial thickness of about 20% to about 50% of the radial thickness of the wall portion and an axial thickness of about 50% to about 90% of the axial thickness of the wall portion.

5. The product of claim 2 wherein the at least one insert is circumferentially disposed in only the labyrinth section.

6. The product of claim 2 wherein the at least one insert is circumferentially disposed in only the hoop section.

7. The product as set forth in claim 1 wherein the at least one insert is a plurality of arcuate inserts.

8. The product as set forth in claim 7 wherein the plurality of inserts are circumferentially disposed in the wall portion in an end-to-end relationship and wherein each insert spans an arc of the wall portion that ranges from about 15° to about 135°.

9. The product of claim 8 wherein four inserts are disposed in the wall portion in an end-to-end relationship with each of the four inserts spanning about an 85° arc of the wall portion.

10. The product of claim 1 wherein the web portion comprises an axially extending edge that is circumferentially disposed in the wall portion and wherein the at least one insert is part of the axially extending edge.

11. The product of claim 1 wherein the at least on insert is disposed in only the web portion.

12. The product of claim 1 wherein the at least one insert is constructed from low carbon mild steel, an aluminum steel composite, cast iron, grey cast iron, a ferrous manganese alloy, a metal matrix composite, ductile iron, or stainless steel.

13. The product of claim 1 wherein the insert comprises a textured surface for forming the interfacial boundary.

14. The product of claim 13 wherein the textured surface comprises a rough surface contour having peaks and valleys.

15. The product of claim 14 wherein the valleys have an average depth of about 1 μm to about 300 μm.

16. The product of claim 13 wherein the textured surface comprises particles or fibers.

17. The product of claim 16 wherein the particles or fibers comprise a coating that comprises refractory materials, graphite, a ceramic, or combinations thereof, and wherein the coating has a thickness from about 1 μm to about 400 μm.

18. A product as set forth in claim 1 wherein the insert has a first face and an opposite second face wherein each of the first face and second face engages the casting for friction damping relative movement with the casting metal.

19. A product comprising:
a brake drum constructed from a first material and comprising a web portion and wall portion depending from the web portion and defining an inner cylindrical face configured for engagement with at least one brake element, the wall portion comprising a labyrinth section for movably pairing with a backing plate and a hoop section between the labyrinth section and the web portion that comprises most of the inner cylindrical face;
at least one cast-in-place insert constructed from a second material, the at least one insert having a textured surface and being entirely disposed in the wall portion, wherein the wall portion comprises a cast metal and the cast metal engulfs all or a substantial part of the at least one insert; and
an interfacial boundary formed along an interior surface of the wall portion and each of a radial inner portion and an opposing radial outer of the at least one insert such that relative movement with respect to the cast metal experienced at the interfacial boundary generates friction and dissipates energy so as to reduce vibrations in the brake drum when the at least one brake element engages the inner cylindrical face of brake drum.

20. The product of claim 19 wherein the at least one insert is circumferentially disposed in only the labyrinth section or only the hoop section.

21. The product of claim 19 wherein the at least one insert is a plurality of inserts that are circumferentially disposed in the wall portion in an end-to-end relationship, and wherein each insert spans an arc of the wall portion that ranges from about 15° to about 135°.

22. The product of claim 19 wherein the brake drum is constructed from cast iron and the at least one insert is constructed from a low carbon mild steel.

23. The product of claim 19 wherein the at least one insert is constructed from an aluminum steel composite, cast iron, grey cast iron, a ferrous manganese alloy, a metal matrix composite, ductile iron, or stainless steel.

24. The product of claim 19 wherein the textured surface comprises a rough-surface contour of peaks and valleys and wherein the average depth of the valleys is from about 1 μm to about 300 μm.

25. The product of claim 19 wherein the textured surface comprises particles or fibers embedded on the at least one insert, and wherein the particles or fibers are those of refractory materials, graphite, a ceramic, or combinations thereof.

26. The product of claim 19 wherein the textured surface comprises a coating of particles or fibers on the at least one insert, the coating having a thickness of from about 1 μm to about 400 μm, and wherein the particles or fibers are those of refractory materials, graphite, a ceramic, or combinations thereof.

27. The product of claim 26 wherein the coating comprises a water-soluble graphite and a binder.

28. The product of claim 27 wherein the binder comprises an epoxy resin, a phosphoric acid binding agent, a calcium aluminate cement, a wood flour, a clay, or a lignosulfonate.

29. The product of claim 26 wherein the coating is a ceramic coating.

30. The product of claim 19 wherein the hoop section defines a radial thickness of the wall portion and the labyrinth section and the hoop section defines an axial thickness of the wall portion, and wherein the at least one insert is circumferentially disposed in both the labyrinth section and the hoop section and is rectangularly sized in cross section to have a radial thickness of about 20% to about 50% of the radial thickness of the wall portion and an axial thickness of about 50% to about 90% of the axial thickness of the wall portion.

31. A product comprising:
a brake drum comprising a wall portion and an insert intimately and entirely surrounded by the wall portion and constructed and arranged for frictional movement against an interior surface of the wall portion to damp vibrations in the brake drum.

32. The product as set forth in claim 31 wherein the brake drum further comprises a web portion from which the wall portion circumferentially depends.

33. The product as set forth in claim 31 wherein the brake drum comprises a web portion comprising the wall portion.

34. A product comprising:
a brake drum comprising a web portion and a wall portion circumferentially depending from the web portion and defining an inner cylindrical face;
at least one brake element configured for selective frictional engagement with the inner cylindrical face of the wall portion; and
a friction damping means intimately surrounded by and completely received in the web portion, the wall portion, or both the web portion and the wall portion, the friction damping means having a radial inner surface and an opposing radial outer surface, wherein an interfacial boundary between each of the radial inner surface and the opposing radial outer surface of the friction damping means and an interior surface of the web portion; the wall portion, or both the web portion and the wall portion of the brake drum experiences relative movement and generates friction when the at least one brake element engages the inner cylindrical face of the wall portion.

35. A product comprising:
a brake drum having a web portion and a wall portion depending from the web portion and defining an inner cylindrical face configured for frictional engagement with at least one brake element; and
at least one insert disposed inside the web portion, the wall portion, or both the web portion and the wall portion;
wherein the at least one insert friction damps vibrations in the brake drum by forming an interfacial boundary that experiences relative movement and generates friction when vibrations are imparted to the brake drum wherein the plurality of inserts are circumferentially disposed in the wall portion in an end-to-end relationship and wherein each insert spans an arc of the wall portion that ranges from about 15° to about 135°.

36. A product comprising:
a brake drum constructed from a first material and comprising a web portion and wall portion depending from the web portion and defining an inner cylindrical face configured for engagement with at least one brake element, the wall portion comprising a labyrinth section for movably pairing with a backing plate and a hoop section between the labyrinth section and the web portion that comprises most of the inner cylindrical face;
at least one insert constructed from a second material and being at least partially disposed in the wall portion, and wherein the insert includes a textured surface; and
an interfacial boundary formed along an interior surface of the wall portion and the textured surface of the at least one insert such that relative movement experienced at the interfacial boundary generates friction and dissipates energy so as to reduce vibrations in the brake drum when the at least one brake element engages the inner cylindrical face of brake drum, and wherein the at least one insert is a plurality of inserts that are circumferentially disposed in the wall portion in an end-to-end relationship, and wherein each insert spans an arc of the wall portion that ranges from about 15° to about 135°.

37. A product comprising:

a brake drum having a web portion and a wall portion depending from the web portion and defining an inner cylindrical face configured for frictional engagement with at least one brake element; and at least one insert disposed entirely inside the brake drum within the wall portion, the insert being substantially coexistential in axial height with the wall portion;

wherein the at least one insert friction damps vibrations in the brake drum by forming an interfacial boundary that experiences relative movement and generates friction when vibrations are imparted to the brake drum.

38. A product comprising:

a brake drum having a web portion and a wall portion depending from the web portion and defining an inner cylindrical face configured for frictional engagement with at least one brake element; and at least one insert intimately and entirely surrounded by the web portion or the wall portion, or by the combination of both the web portion and the wall portion of the brake drum;

wherein the at least one insert friction damps vibrations in the brake drum by forming an interfacial boundary that experiences relative movement and generates friction when vibrations are imparted to the brake drum.

39. A product comprising:

a brake drum having a web portion and a wall portion depending from the web portion and defining an inner cylindrical face configured for frictional engagement with at least one brake element; and at least one cast-in-place insert intimately surrounded by the web portion, the wall portion, or both the web portion and the wall portion; the web portion and wall portion comprising cast metal, wherein the cast metal engulfs all of the insert, wherein the at least one insert friction damps vibrations in the brake drum by forming an interfacial boundary that experiences relative movement with respect to the cast metal and generates friction when vibrations are imparted to the brake drum.

* * * * *